US012811543B2

(12) United States Patent
Yang et al.

(10) Patent No.: US 12,811,543 B2
(45) Date of Patent: Nov. 24, 2026

(54) DIFFERENTIAL POWER PROCESSING APPARATUS FOR PHOTOVOLTAIC POWER GENERATION

(71) Applicant: NANOOMENERGY CO., LTD., Jeju-si (KR)

(72) Inventors: Ji Hyeok Yang, Seogwipo-si (KR); Joon Woo Kim, Jeju-si (KR); Ankhzaya Baatarbileg, Jeju-si (KR)

(73) Assignee: NANOOMENERGY CO., LTD., Jeju-si (KR)

( * ) Notice: Subject to any disclaimer, the term of this patent is extended or adjusted under 35 U.S.C. 154(b) by 32 days.

(21) Appl. No.: 19/106,682

(22) PCT Filed: Nov. 22, 2022

(86) PCT No.: PCT/KR2022/018531
§ 371 (c)(1),
(2) Date: Jun. 26, 2025

(87) PCT Pub. No.: WO2024/048850
PCT Pub. Date: Mar. 7, 2024

(65) Prior Publication Data

US 2026/0088753 A1 Mar. 26, 2026

(30) Foreign Application Priority Data

Aug. 31, 2022 (KR) ........................ 10-2022-0109702
Nov. 18, 2022 (KR) ........................ 10-2022-0155107

(51) Int. Cl.
*H02S 40/36* (2014.01)

(52) U.S. Cl.
CPC .................................... *H02S 40/36* (2014.12)

(58) Field of Classification Search
CPC ....................................................... H02S 40/36
See application file for complete search history.

(56) References Cited

U.S. PATENT DOCUMENTS

2018/0248513 A1* 8/2018 Höft ........................ H02S 50/00

FOREIGN PATENT DOCUMENTS

KR 10-1550368 B1 9/2015
KR 10-2017-0013745 A 2/2017
(Continued)

OTHER PUBLICATIONS

IEEE Transactions On Power Electronics. vol. 28, No. 6. Jun. 2013.*
(Continued)

*Primary Examiner* — Robert L Deberadinis
(74) *Attorney, Agent, or Firm* — Bridgeway IP Law Group, PLLC; Jihun Kim

(57) ABSTRACT

A differential power processing apparatus for photovoltaic power generation may include: a first terminal connected to a negative output terminal of a first photovoltaic module located outside; a second terminal connected to a positive output terminal of the first photovoltaic module; a third terminal connected to a negative output terminal of a second photovoltaic module located outside; a fourth terminal connected to a positive output terminal of the second photovoltaic module; a first switch located between the first terminal and the fourth terminal and mediating an electrical connection between the first photovoltaic module and the second photovoltaic module; a second switch connected between the second terminal and the third terminal; and a third switch including a first end connected to the third terminal, and a second end connected to the second switch.

8 Claims, 7 Drawing Sheets

(56) References Cited

FOREIGN PATENT DOCUMENTS

| | | | |
|---|---|---|---|
| KR | 10-2017-0039996 | A | 4/2017 |
| KR | 10-2021-0120431 | A | 10/2021 |

OTHER PUBLICATIONS

Pradeep S. Shenoy et al., “Differential Power Processing for Increased Energy Production and Reliability of Photovoltaic Systems”, IEEE Transactions on Power Electronics, Jun. 2013, vol. 28, No. 6, IEEE, USA.

* cited by examiner

DIFFERENTIAL POWER PROCESSING APPARATUS FOR PHOTOVOLTAIC POWER GENERATION

TECHNICAL FIELD

The disclosure relates to a power processing apparatus for photovoltaic power generation, and a differential power processing apparatus for processing power mismatches between photovoltaic modules.

BACKGROUND ART

As the proportion of new and renewable energy is increasing worldwide due to environmental pollution and resource depletion issues, demand for solar power generation, i.e., one of the new and renewable energy sources is continuously growing. A solar power generation system may be installed on the rooftop or roof of a building or may be installed as a building integrated photovoltaic (BIPV) system.

With the growing demand for the solar power generation system, development of technologies for processing photovoltaic power is taking place in various fields. Among the technologies, a differential power processing (DPP) converter is capable of having a low-capacity design to process only power mismatches between photovoltaic modules, and operates in a standby mode when there are no output mismatches between the photovoltaic modules, thereby having an advantage of low power conversion loss compared to the existing optimizer that processes full power.

FIG. 1 is a circuit diagram showing the schematic configuration of a conventional photovoltaic differential power processing system.

Referring to FIG. 1, photovoltaic modules (or panels) PV that generate power are connected in series, and differential power processing converters DPP are each connected in parallel to one pair of photovoltaic modules PV, thereby changing the path of current according to difference in power generation between the photovoltaic modules PV to compensate for current mismatches between the photovoltaic modules PV.

With this configuration of the conventional system where one photovoltaic module PV is connected to two differential power processing converters DPP, each photovoltaic module PV ultimately requires wiring for the adjacent photovoltaic modules PV and wiring for the two differential power processing converters DPP. For the wiring branched out in this way, devices such as Y connectors are used. However, these devices are required to have waterproof and dustproof performance due to their external wiring, and make it difficult to arrange the wiring due to many wires exposed to the outside. In particular, the BIPV system increases difficulty in installing the differential power processing system because there is not much room for installation space.

Meanwhile, with the recent installation of the photovoltaic power generation system, standards for ensuring safety are also being strengthened. In the case of the BIPV system, more safety management is needed because a fire in the photovoltaic power generation system may lead to a fire in the entire building. While a traditional full power optimizer that processes the full output of photovoltaic module is connected in series to each photovoltaic module and thus makes it easy to cut off the output in the event of a fire, the differential power processing system where the DPP is connected in parallel to the PV as shown in FIG. 1 has a problem that, with the basic wiring, it is impossible to cut off the output of the PV.

DISCLOSURE

Technical Problem

The disclosure has been conceived to solve the problems of the related art as mentioned above, and an aspect of the disclosure is to provide a differential power processing apparatus for photovoltaic power generation, in which external wiring is simplified to ensure ease of installation upon applying a differential power processing system, and safety is ensured by cutting off power in the event of a fire.

Technical Solution

According to an embodiment of the disclosure, a differential power processing apparatus for photovoltaic power generation, which compensates for a power mismatch between a pair of photovoltaic modules, includes: a first terminal connected to a negative output terminal of a first photovoltaic module located outside; a second terminal connected to a positive output terminal of the first photovoltaic module; a third terminal connected to a negative output terminal of a second photovoltaic module located outside; a fourth terminal connected to a positive output terminal of the second photovoltaic module; a first switch located between the first terminal and the fourth terminal and mediating an electrical connection between the first photovoltaic module and the second photovoltaic module; a second switch connected between the second terminal and the third terminal; a third switch including a first end connected to the third terminal, and a second end connected to the second switch; and an inductor including a first end connected to a first node located between the second switch and the third switch, and a second end connected to a second node located between the first terminal and the first switch.

According to another embodiment of the disclosure, a differential power processing apparatus for photovoltaic power generation, which compensates for a power mismatch between a pair of photovoltaic modules, includes: first and second terminals provided for connection with a first photovoltaic module located outside; third and fourth terminals provided for connection with a first differential power processing apparatus located outside; and fifth and sixth terminals provided for connection with a second differential power processing apparatus located outside, wherein the first terminal is connected to a positive output terminal of the first photovoltaic module, and the second terminal is connected to a negative output terminal of the first photovoltaic module, the third terminal is internally connected to the first terminal and mediates connection between the positive output terminal of the first photovoltaic module and the first differential power processing apparatus, and the fourth terminal is internally connected to the second terminal and mediates connection between the negative output terminal of the first photovoltaic module and the first differential power processing apparatus, and the fifth terminal is connected to a positive output terminal of a second photovoltaic module located outside via the connection with the second differential power processing apparatus, and the sixth terminal is connected to a negative output terminal of the second photovoltaic module via the connection with the second differential power processing apparatus.

Here, the second terminal and the fifth terminal may be connected internally to provide a series connection between the first photovoltaic module and the second photovoltaic module.

In addition, the differential power processing apparatus may further include a first switch located between the second terminal and the fifth terminal and mediating an electrical connection between the first photovoltaic module and the second photovoltaic module.

Further, the differential power processing apparatus may further include: a second switch connected between the third terminal and the sixth terminal; a third switch including a first end connected to the sixth terminal and a second end connected to the second switch; and an inductor including a first end connected to a first node located between the second switch and the third switch, and a second end connected to a second node located between the second terminal and the fifth terminal.

According to still another embodiment of the disclosure, a differential power processing apparatus for photovoltaic power generation, which compensates for a power mismatch between a pair of photovoltaic modules, includes: a first terminal provided for connection with a negative output terminal of a first photovoltaic module located outside; a second terminal provided for connection with a positive output terminal of a second photovoltaic module located outside; a third terminal provided for connection with a positive terminal of a first differential power processing apparatus located outside; a fourth terminal provided for connection with a negative terminal of the first differential power processing apparatus; a fifth terminal provided for connection with a positive terminal of a second differential power processing apparatus located outside; and a sixth terminal provided for connection with a negative terminal of the second differential power processing apparatus, wherein the first terminal is internally connected to the fourth terminal, and the second terminal is internally connected to the fifth terminal, and the third terminal is connected to a positive output terminal of the first photovoltaic module via the connection with the first differential power processing apparatus, and the sixth terminal is connected to a negative output terminal of the second photovoltaic module via the connection with the second differential power processing apparatus.

Here, the first terminal and the second terminal may be connected internally to provide a series connection between the first photovoltaic module and the second photovoltaic module.

In addition, the differential power processing apparatus may further include a first switch located between the first terminal and the second terminal, and mediating an electrical connection between the first photovoltaic module and the second photovoltaic module.

Further, the differential power processing apparatus may further include: a second switch connected between the third terminal and the sixth terminal; a third switch including a first end connected to the sixth terminal, and a second end connected to the second switch; and an inductor including a first end connected to a first node located between the second switch and the third switch, and a second end connected to a second node located between the first terminal and the second terminal.

Advantageous Effects

As described above, according to the disclosure, the differential power processing converter internally cuts off the output of the photovoltaic module, thereby ensuring safety in the event of a fire.

Further, according to the disclosure, the external wiring is simplified by connecting the differential power processing converter and the photovoltaic module in series externally and making parallel wiring inside the differential power processing converter, thereby improving the ease of installation.

BEST MODE

Figure 1:
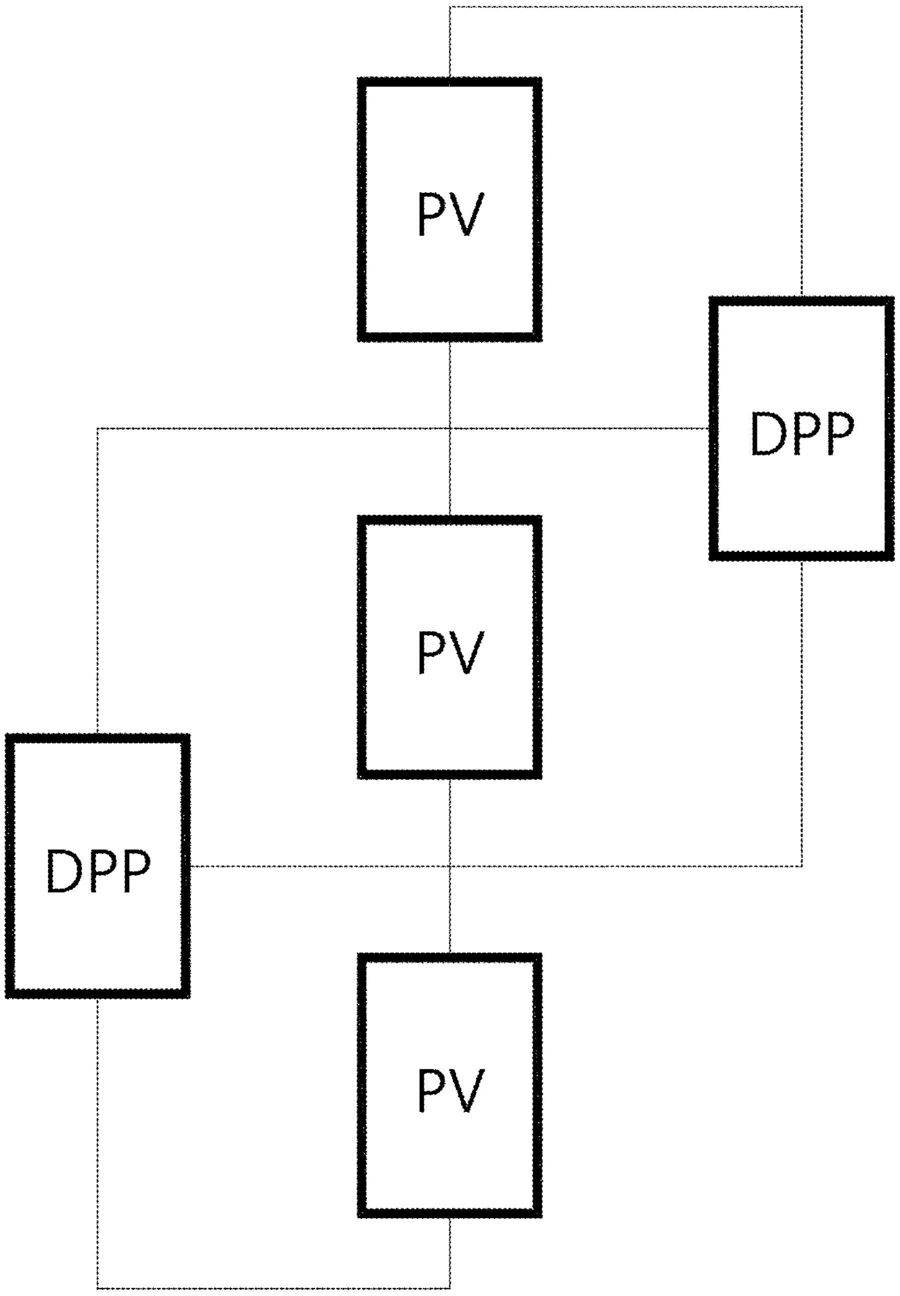
Prior Art FIG. 1
FIG. 1 is a circuit diagram showing the schematic configuration of a conventional photovoltaic differential power processing system.

Below, specific embodiments of the disclosure will be described with reference to the drawings. However, detailed descriptions of known functions or configurations that may obscure the gist of the disclosure in the following description and the accompanying drawings will be omitted. Further, it should be noted that like numerals refer to like elements identical components are indicated with the same drawing reference numerals throughout the drawings.

For reference, FIGS. 2 to 7 mainly illustrate the wiring structures of a photovoltaic module and a differential power processing apparatus (converter) and the configurations of the differential power processing apparatus, without explicitly illustrating the general configurations of the photovoltaic power generation system, such as an inverter for converting direct current power into alternating current power, and a controller for controlling the operations of the differential power processing apparatus.

Further, for the convenience of illustration in the drawings, the photovoltaic differential power processing system where two or three photovoltaic modules are connected to the differential power processing converter, but it is obvious that more photovoltaic modules may be connected to the differential power processing converter in the same manner as shown in the drawings.

Figure 2:
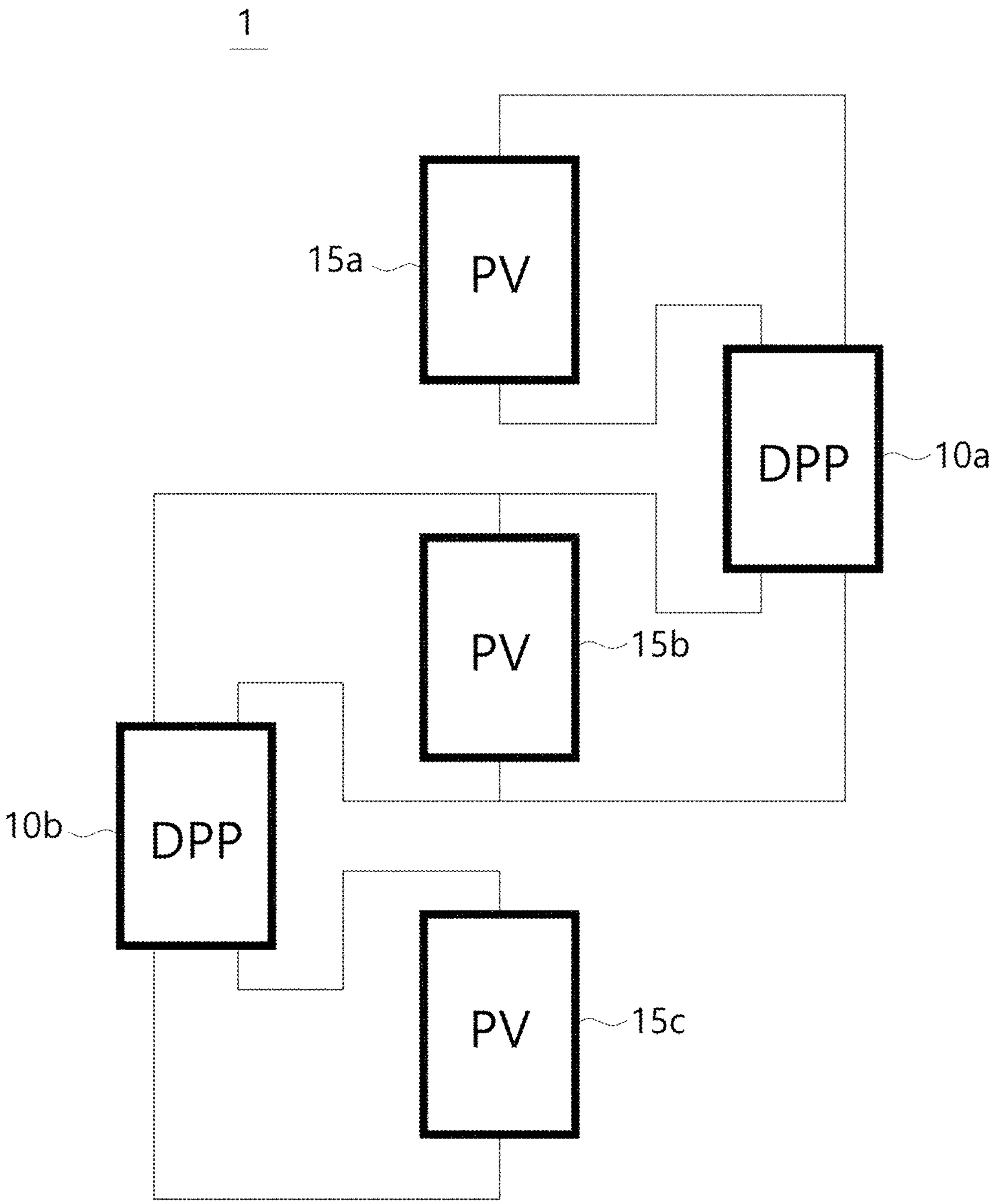
FIG. 2 is a circuit diagram showing the external wiring of a photovoltaic differential power processing system to which a differential power processing converter according to a first embodiment of the disclosure is applied.
Figure 3:
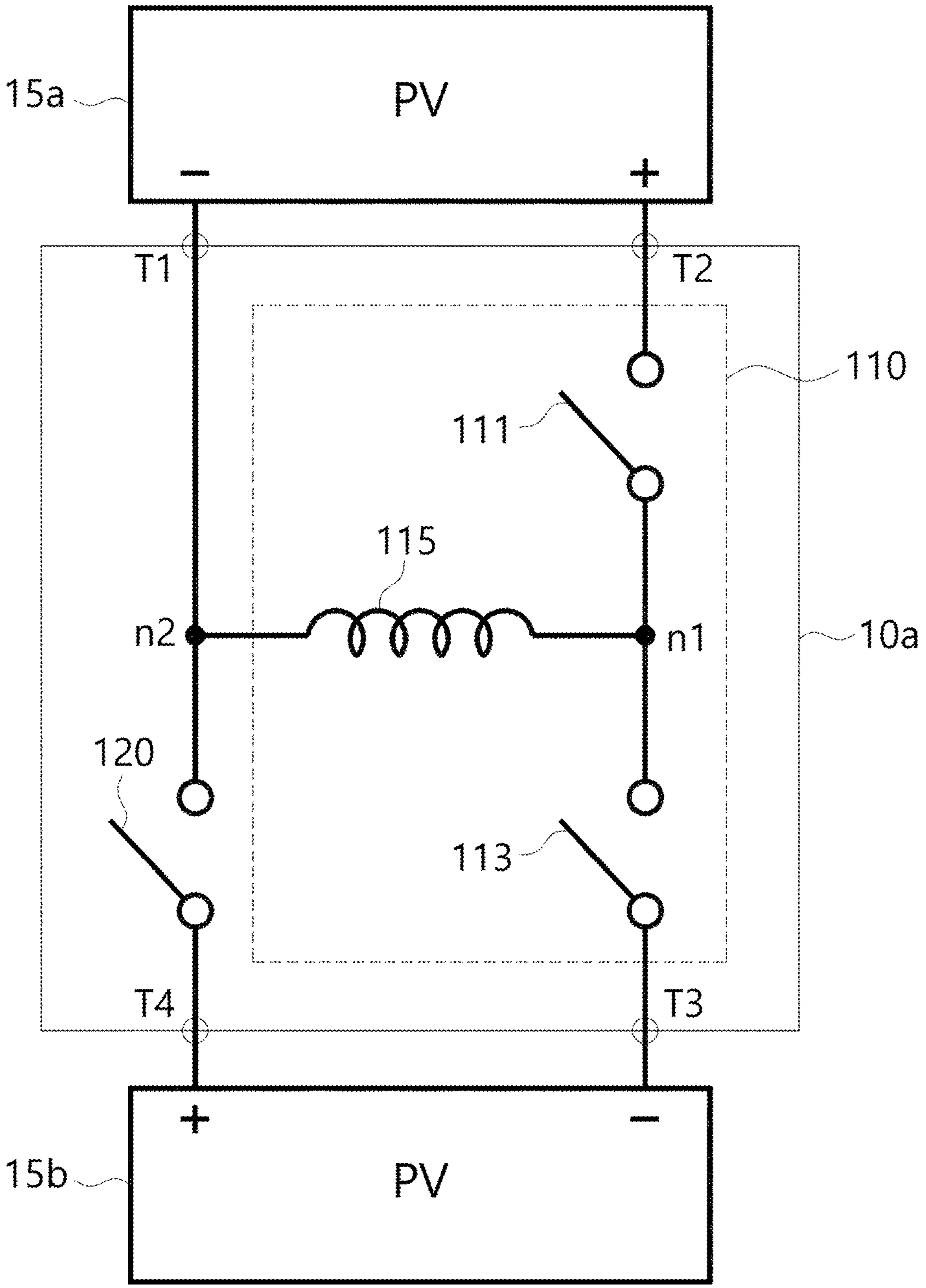
FIG. 3 is a circuit diagram showing the internal configuration of the differential power processing converter according to the first embodiment of the disclosure applied to the system of FIG. 2.

FIG. 2 is a circuit diagram showing the external wiring of a photovoltaic differential power processing system 1 to which a differential power processing converter according to a first embodiment of the disclosure is applied, and FIG. 3 is a circuit diagram showing the internal configuration of the differential power processing converter 10 according to the first embodiment of the disclosure applied to the system 1 of FIG. 2.

Referring to FIGS. 2 and 3, each differential power processing converter 10 is connected to two photovoltaic modules 15, in which the two photovoltaic modules 15 required to be connected in series to each other for differential power processing are not externally wired to each other.

Thus, the differential power processing converter 10 includes four terminals T1, T2, T3 and T4 capable of being respectively connected to the outputs of the two photovoltaic modules 15 so as to provide a series connection between the two photovoltaic modules 15 inside the converter.

For example, referring to FIG. 3, a differential power processing converter 10*a* includes first to fourth terminals T1, T2, T3 and T4 respectively connectable to positive output terminals and negative output terminals of a first photovoltaic module 15*a* and a second photovoltaic module 15*b*.

In other words, the differential power processing converter 10*a* includes a first terminal T1 connected to the negative output terminal of the first photovoltaic module 15*a* positioned at the top, a second terminal T2 connected to the positive output terminal of the first photovoltaic module 15*a*, a third terminal T3 connected to the negative output terminal of a second photovoltaic module 15*b* positioned at the bottom, and a fourth terminal T4 connected to the positive output terminal of the second photovoltaic module 15*b*.

Further, each differential power processing converter 10 internally includes a power mismatch compensator 110, and an output control switch 120.

The power mismatch compensator 110 is to compensate for a power mismatch between the two photovoltaic modules 15*a* and 15*b* connected to the differential power processing converter 10*a*, and includes two switches 111 and 113 connected in series to each other, and one inductor 115. The two switches 111 and 113 are installed at a first end of the inductor 115, and form a current path between the photovoltaic modules 15*a* and 15*b* connected to the differential power processing converter 10*a*. In more detail, a first switch 111 and a second switch 113 are connected in series between the second terminal T2 and the third terminal T3. In other words, the first switch 111 has a first end connected to the second terminal T2, and a second end connected to the second switch 113. The second switch 113 has a first end connected to the third terminal T3, and a second end connected to the first switch 111. Meanwhile, the inductor 115 has the first end connected to a first node n1 located between the first switch 111 and the second switch 113, and a second end connected to a second node n2 located between the first terminal T1 and the output control switch 120.

Under control of a controller (not shown), the two switches 111 and 113 operate complementarily to each other to compensate for the power mismatch between the photovoltaic modules 15*a* and 15*b*. For example, when the first switch 111 is turned on, the second switch 113 is turned off, and when the second switch 113 is turned on, the first switch 111 is turned off, thereby forming the current path to compensate for the power mismatch between the photovoltaic modules 15*a* and 15*b*.

The output control switch 120 is located between the first terminal T1 and the fourth terminal T4, and mediates an electrical connection between the two photovoltaic modules 15*a* and 15*b* connected to the differential power processing converter 10*a*. When the output control switch 120 is turned off inside the differential power processing converter 10*a*, the series connection between the first photovoltaic module 15*a* and the second photovoltaic module 15*b* connected below the first photovoltaic module 15*a* is disconnected. In this way, starting with the output of the second photovoltaic module 15*b*, the outputs of a plurality of photovoltaic modules 15 connected in series below the second photovoltaic module 15*b*, including a third photovoltaic module 15*c*, are all cut off.

Meanwhile, when the output control switch 120 is turned off, the switches 111 and 113 for the power compensation are also controlled to be turned off, thereby blocking a path through which the output power of the second photovoltaic module 15*b* connected below, of which the series connection is disconnected, may be bypassed. In other words, the differential power processing is performed by compensating for the power through the control of the switches 111 and 113 only when the output control switch 120 is turned on to allow the output of the second photovoltaic module 15*b* connected below.

Meanwhile, when the output control switch 120 is turned off and the series connection of the second photovoltaic module 15*b* connected below is disconnected, the differential power processing converter 10*a* may operate with power received from the first photovoltaic module 15*a* connected above.

In this way, the wiring between the photovoltaic modules 15 is provided inside the differential power processing converter 10 to simplify the external wiring, and the output control switch 120 provided inside the differential power processing converter 10 controls whether to cut off the outputs of the photovoltaic modules 15 connected below to ensure the safety in the event of an emergency in a building.

Figure 4:
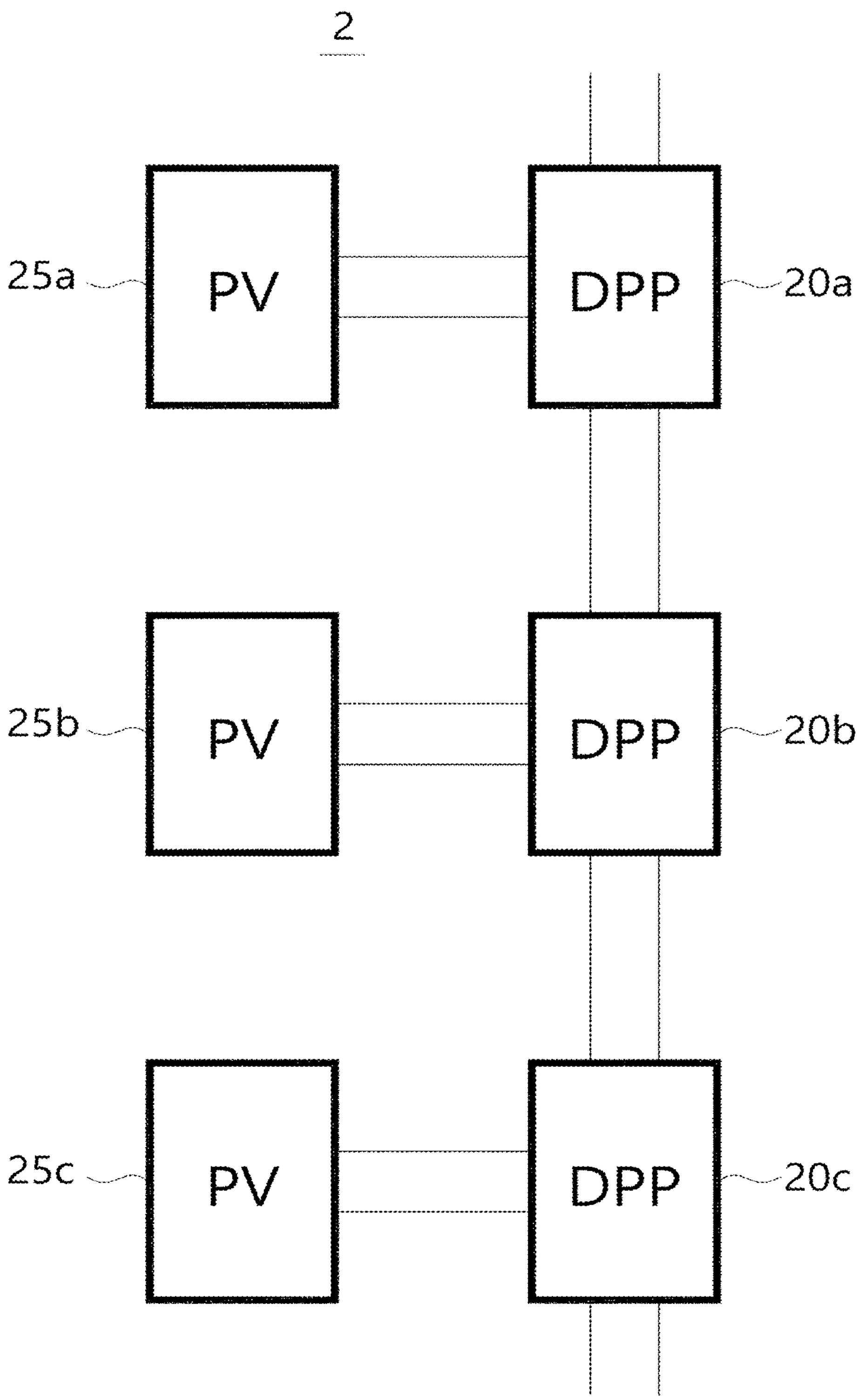
FIG. 4 is a circuit diagram showing the external wiring of a photovoltaic differential power processing system to which a differential power processing converter according to a second embodiment of the disclosure is applied.
Figure 5:
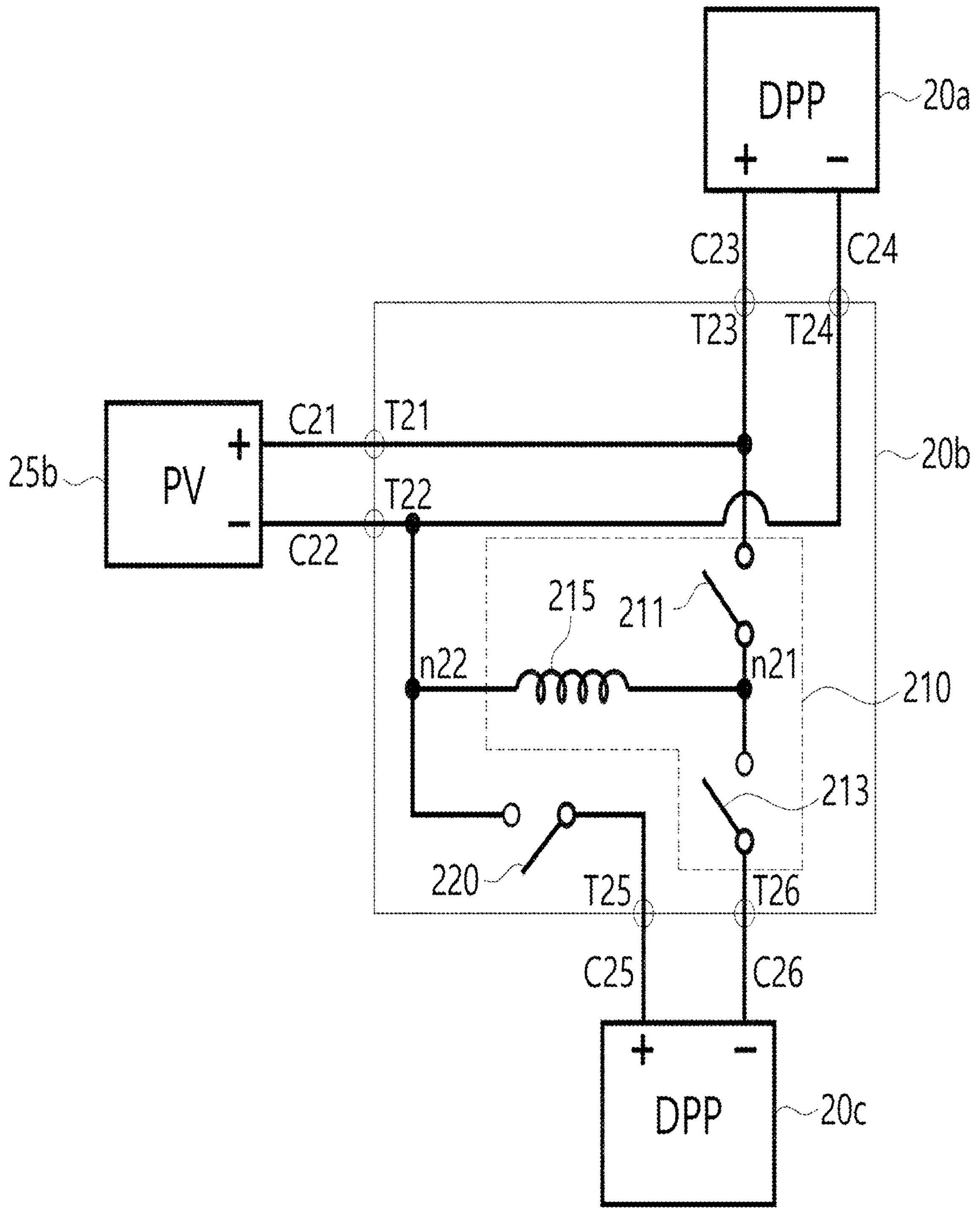
FIG. 5 is a circuit diagram showing the internal configuration of the differential power processing converter according to the second embodiment of the disclosure applied to the system of FIG. 4.

FIG. 4 is a circuit diagram showing the external wiring of a photovoltaic differential power processing system 2 to which a differential power processing converter 20 according to a second embodiment of the disclosure is applied, and FIG. 5 is a circuit diagram showing the internal configuration of the differential power processing converter 20 according to the second embodiment of the disclosure applied to the system 2 of FIG. 4.

Referring to FIGS. 4 and 5, all wires coming from each photovoltaic module 25 are connected to the differential power processing converter 20 without any additional external wiring.

The internal configuration of the differential power processing converter 20 is as follows. The differential power processing converter 20 includes a power mismatch compensator 210 and an output control switch 220, which is the same as that of the first embodiment. However, the external and internal wiring structures between the photovoltaic module 25 and the differential power processing converter 20 are different from those of the first embodiment.

Below, the external wiring structure of a differential power processing converter 20*b* will be described. The differential power processing converter 20*b* includes six terminals T21 to T26 in total: a first terminal T21 and a second terminal T22 provided for connection with a first photovoltaic module 25*b* located outside, a third terminal T23 and a fourth terminal T24 provided for connection with a first differential power processing apparatus 20*a* located outside, and a fifth terminal T25 and a sixth terminal T26 provided for connection with a second differential power processing apparatus 20*c* located outside.

Referring to FIG. 5, the terminal T21 is connected to the positive output terminal of the first photovoltaic module

25*b*, and the terminal T22 is connected to the negative output terminal of the first photovoltaic module 25*b*, so that the differential power processing converter 20*b* can be directly connected to the first photovoltaic module 25*b* via the terminal T21 and the terminal T22. Here, the positive output terminal and the negative output terminal the first photovoltaic module 25*b* are directly connected to the differential power processing converter 20*b* via the terminals T21 and T22 and connectors C21 and C22.

Meanwhile, the differential power processing converter 20*b* is connected to the first differential power processing converter 20*a* connected above the differential power processing converter 20*b* and the second differential power processing converter 20*c* connected below the differential power processing converter 20*b* via the terminals T23, T24, T25, and T26.

Here, the terminal T23 is internally connected to the terminal T21 to mediate the connection between the positive output terminal of the first photovoltaic module 25*b* directly connected to the differential power processing converter 20*b* and the first differential power processing converter 20*a*, and the terminal T24 is internally connected to the terminal T22 to medicate the negative output terminal of the first photovoltaic module 25*b* and the first differential power processing apparatus 20*a*. Meanwhile, the terminal T25 is connected to a positive output terminal of a second photovoltaic module 25*c*, which is located outside, via the connection with the second differential power processing converter 20*c*, and the terminal T26 is connected to a negative output terminal of the second photovoltaic module 25*c* via the connection with the second differential power processing converter 20*c*.

In this case, the second photovoltaic module 25*c* connected below may be connected to the differential power processing converter 20*b* via the second differential power processing converter 20*c*, which is located below, through connector C25 and C26. In other words, the positive output terminal of the second photovoltaic module 25*c* may be connected to the terminal T25 through the connector C25, and the negative output terminal of the second photovoltaic module 25*c* may be connected to the terminal T26 through the connector C26. For reference, although the connection with the second photovoltaic module 25*c* is not illustrated in FIG. 5, this connection will be understood from that the positive output terminal and the negative output terminal of the first photovoltaic module 25*b* are connected to the first differential power processing converter 20*a* via the differential power processing converter 20*b*.

Further, the terminal T22 and the terminal T25 are internally connected via the output control switch 220, thereby providing the series connection between the first photovoltaic module 25*b* and the second photovoltaic module 25*c* inside the differential power processing converter 20*b*.

Meanwhile, the power mismatch compensator 210 includes two switches 211 and 213 installed at a first end of an inductor 215 to form a current path, and the output control switch 220 is provided to limit the output of the second photovoltaic module 25*c* connected below the differential power processing converter 20*b* via the second differential power processing converter 20*c*, which are the same as in the foregoing embodiment.

A specific connection relationship inside the differential power processing converter 20*b* is as follows. A first switch 211 and a second switch 213 are connected in series between the terminal T23 and the terminal T26. In other words, the first switch 211 has a first end connected to the terminal T23, and a second end connected to the second switch 213. The second switch 213 has a first end connected to the terminal T26, and a second end connected to the first switch 211. Meanwhile, the inductor 215 has the first end connected to a first node n21 located between the first switch 211 and the second switch 213, and a second end connected to a node located between the terminal T22 and the terminal T25, specifically, a second node n22 located between the terminal T22 and the output control switch 220.

The output control switch 220 is connected between the terminal T22 and the terminal T25, and mediates an electrical connection between the first photovoltaic module 25*b* and the second photovoltaic module 25*c*.

As in the foregoing embodiment, the switches 211 and 213 of the power mismatch compensator 210 operate complementarily to each other to compensate for the power mismatch between the first photovoltaic module 25*b* directly connected to the differential power processing converter 20*b* and the second photovoltaic module 25*c* connected to the differential power processing converter 20*b* via the connection with the second differential power processing converter 20*c*. Further, when the output control switch 220 is turned off, the series connection between the first photovoltaic module 25*b* and the second photovoltaic module 25*c* is disconnected, so that the output of the second photovoltaic module 25*c* and the outputs of a plurality of photovoltaic modules 25 connected below the second photovoltaic module 25*c* can be all cut off.

Further, as in the foregoing embodiment, when the output control switch 220 is turned off, the switches 211 and 213 for the power compensation are also turned off, thereby blocking a path through which the output power of the second photovoltaic module 25*c*, of which the series connection is disconnected, may be bypassed.

Here, each internal circuit configuration of the differential power processing converters 20*a*, 20*b* and 20*c* may be implemented using wires or a printed circuit board (PCB).

For reference, FIG. 5 shows the connection of only one photovoltaic module 25*b* to simplify the illustration, but it is obvious that other photovoltaic modules 25*a* and 25*c* may be connected to the differential power processing converters 20*a*, 20*b* and 20*c* in the same manner as the photovoltaic module 25*b*.

Figure 6:
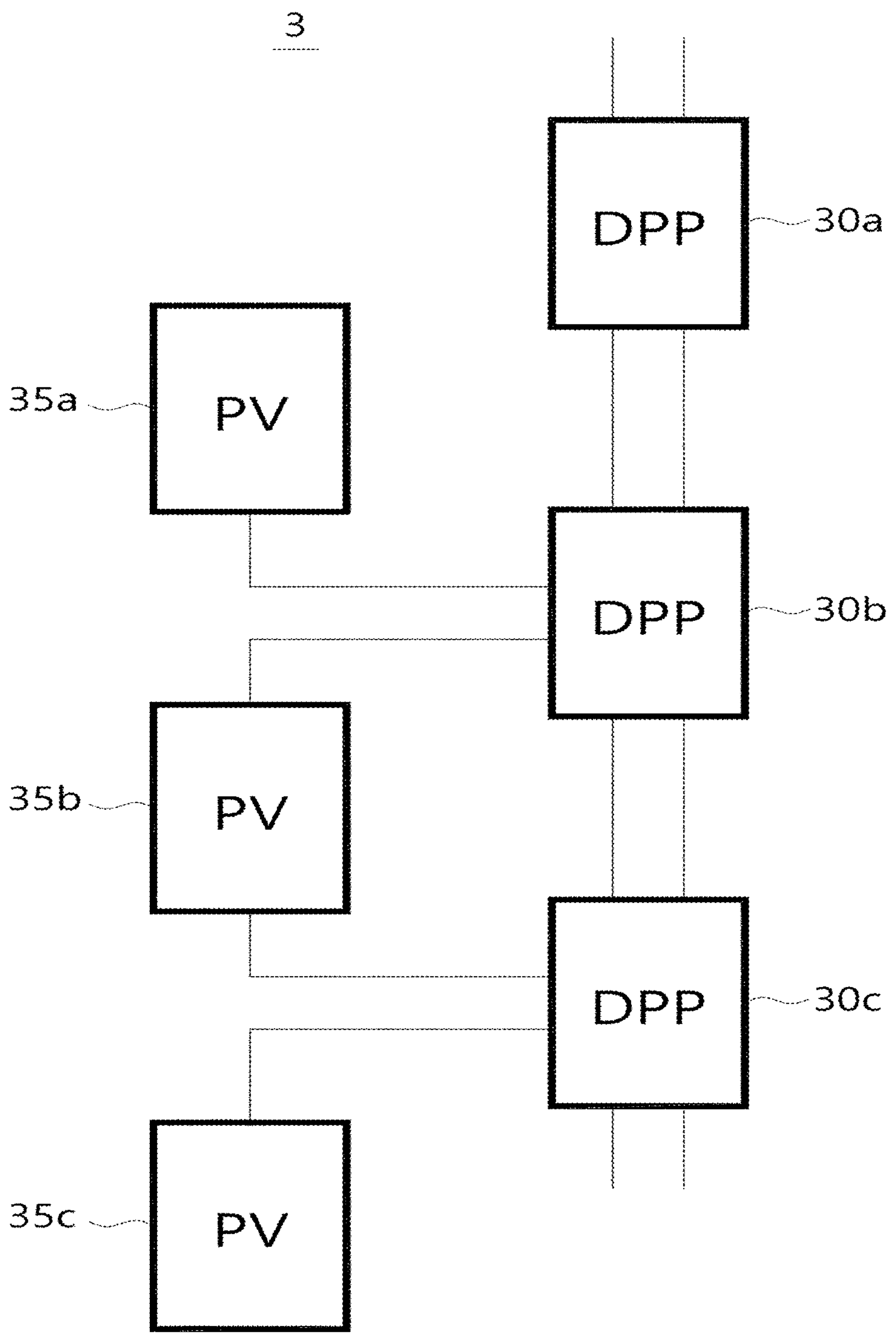
FIG. 6 is a circuit diagram showing the external wiring of a photovoltaic differential power processing system to which a differential power processing converter according to a third embodiment of the disclosure is applied.
Figure 7:
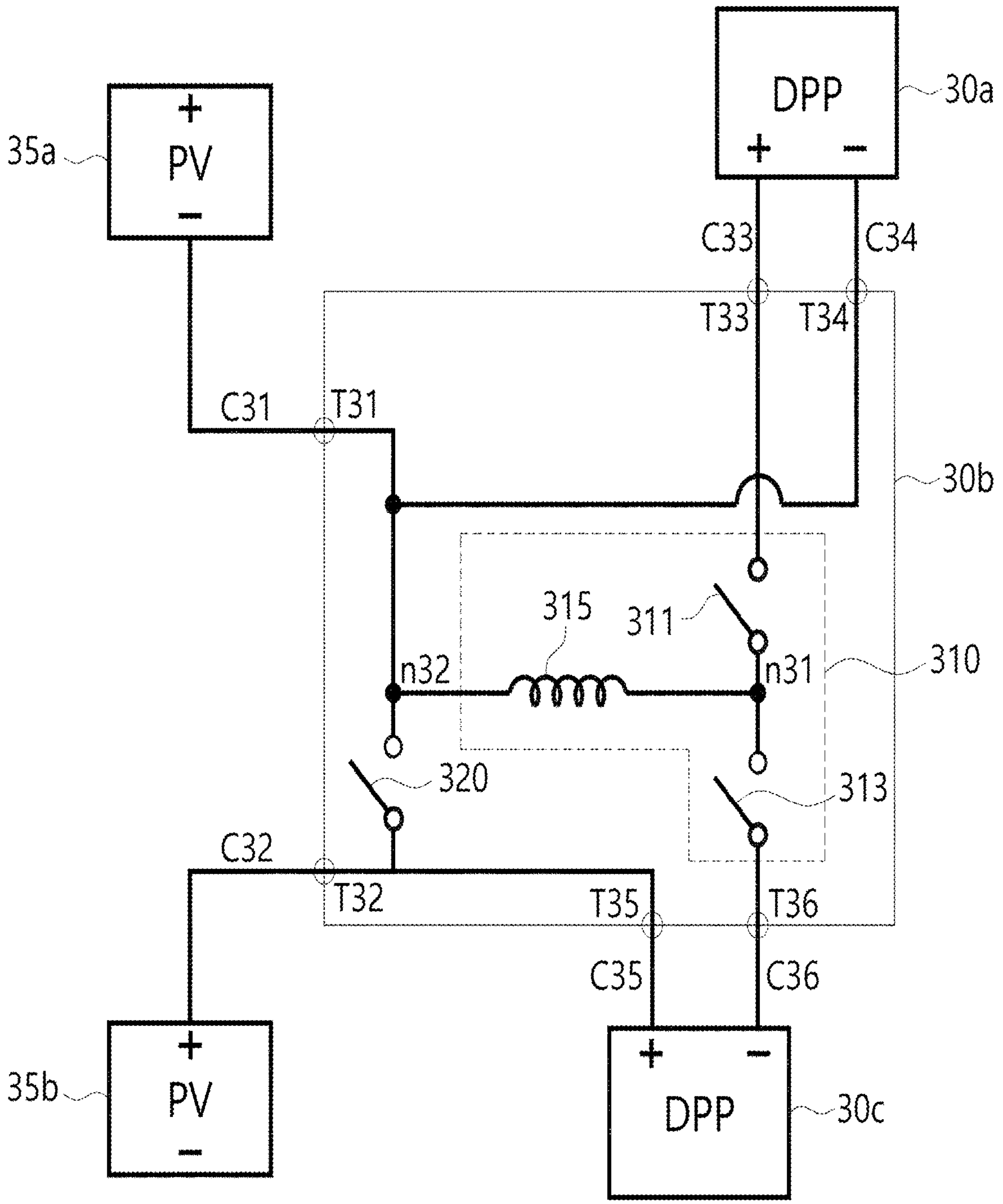
FIG. 7 is a circuit diagram showing the internal configuration of the differential power processing converter according to the third embodiment of the disclosure applied to the system of FIG. 6.

FIG. 6 is a circuit diagram showing the external wiring of a photovoltaic differential power processing system 3 to which a differential power processing converter 30 according to a third embodiment of the disclosure is applied, and FIG. 7 is a circuit diagram showing the internal configuration of the differential power processing converter 30 according to the third embodiment of the disclosure applied to the system 3 of FIG. 6.

In the second embodiment described above, the first photovoltaic module 25*b* of the two photovoltaic modules 25*b* and 25*c* to be connected to the differential power processing converter 20*b* is directly connected to the differential power processing converter 20*b* through the connectors C21 and C22 connector, and the second photovoltaic module 25*c* is connected to the differential power processing converter 20*b* through the second differential power processing converter 20*c* connected below through the connectors C25 and C26.

However, referring to FIGS. 6 and 7, the photovoltaic differential power processing system 3 is different from that of the second embodiment in a wiring configuration between a photovoltaic module 35 and the differential power processing converter 30.

The following description will be made based on a differential power processing converter 30*b*. The differential power processing converter 30*b* according to the third embodiment includes a terminal T31 provided for connection with a negative output terminal of a first photovoltaic module 35*a* connected above of two photovoltaic modules 35*a* and 35*b* to be connected to the differential power processing converter 30*b*, a terminal T32 provided for connection with a positive output terminal of a second photovoltaic module 35*b* located below, a terminal T33 provided for connection with a positive terminal of a first differential power processing converter 30*a* located outside and connected above, a terminal T34 provided for connection with a negative terminal of the first differential power processing converter 30*a*, a terminal T35 provided for connection with a positive terminal of a second differential power processing converter 30*c* located outside and connected below, and a terminal T36 provided for connection with a negative terminal of the second differential power processing converter 30*c*.

Here, inside the differential power processing converter 30*b*, the terminal T31 and the terminal T34 are connected to each other and the terminal T32 and the terminal T35 are connected to each other. Further, the terminal T33 is connected to the positive output terminal of the first photovoltaic module 35*a* via the connection with the first differential power processing converter 30*a*, and the terminal T36 is connected to the negative output terminal of the second photovoltaic module 35*b* via the connection with the second differential power processing converter 30*c*.

Meanwhile, the terminal T31 and the terminal T32 are connected to each other via an output control switch 320 inside the differential power processing converter 30*b*, thereby providing a series connection between the first photovoltaic module 35*a* and the second photovoltaic module 35*b*.

In this way, according to the third embodiment, the negative output terminal of the first photovoltaic module 35*a* located above of the two photovoltaic modules 35*a* and 35*b* to be connected to the differential power processing converter 30*b* is directly connected to the terminal T31 of the differential power processing converter 30*b* through a connector C31, and the positive output terminal of the first photovoltaic module 35*a* is connected to the terminal T33 via the first differential power processing converter 30*a* connected above. In other words, the positive output terminal of the first photovoltaic module 35*a* is connected to the first differential power processing converter 30*a* located above through a connector C33, and thus connected to the differential power processing converter 30*b*. For reference, although connection between the positive output terminal of the photovoltaic module 35*a* and the first differential power processing converter 30*a* is not shown, this connection will be understood from that the positive output terminal of the second photovoltaic module 35*b* located below is also connected to the positive terminal of the second differential power processing converter 30*c* through a connector C35.

Further, the positive output terminal of the second photovoltaic module 35*b* is directly connected to the terminal T32 of the differential power processing converter 30*b* through a connector C32. The negative output terminal of the second photovoltaic module 35*b* is connected to the terminal T36 through the second differential power processing converter 30*c* connected below. In other words, the negative output terminal of the second photovoltaic module 35*b* is connected to the second differential power processing converter 30*c* through a connector C36, and thus connected to the differential power processing converter 30*b*. For reference, although connection between the negative output terminal of the second photovoltaic module 35*b* and the second differential power processing converter 30*c* connected below is not shown, this connection will be understood from that the negative output terminal of the first photovoltaic module 35*a* located above is also connected to the negative terminal of the first differential power processing converter 30*a* through a connector C34.

Besides, a power mismatch compensator 310 includes two switches 311 and 313 installed at a first end of an inductor 315 to form a current path, and the output control switch 320 is provided to limit the output of the second photovoltaic module 35*c* located below, which are the same as in the foregoing embodiment.

In this regard, a connection relationship inside the differential power processing converter 30*b* is as follows. A first switch 311 and a second switch 313 of the power mismatch compensator 310 are connected in series between the terminal T33 and the terminal T36. In other words, the first switch 311 has a first end connected to the terminal T33, and a second end connected to the second switch 313. The second switch 313 has a first end connected to the terminal T36, and a second end connected to the first switch 311. Meanwhile, the inductor 315 has the first end connected to a first node n31 located between the first switch 311 and the second switch 313, and a second end connected to a node located between the terminal T31 and the terminal T33, specifically, a second node n32 located between the terminal T31 and the output control switch 320.

The output control switch 320 is located between the terminal T31 and the terminal T32, and mediates an electrical connection between the first photovoltaic module 35*a* and the second photovoltaic module 35*b*.

As in the foregoing embodiment, the switches 311 and 313 of the power mismatch compensator 310 operate complementarily to each other to compensate for the power mismatch between the first photovoltaic module 35*a* and the second photovoltaic module 35*b* which are connected to the differential power processing converter 30*b*. Further, when the output control switch 320 is turned off, the series connection between the first photovoltaic module 35*a* and the second photovoltaic module 35*b* is disconnected, thereby cutting off the output of the second photovoltaic module 35*b* connected below differential power processing converter 30*b*.

Further, as in the foregoing embodiment, when the output control switch 320 is turned off, the switches 311 and 313 for the power compensation are also turned off together, thereby blocking a path through which the output power of the second photovoltaic module 35*b*, of which the series connection is disconnected, may be bypassed.

As described above, according to the disclosure, the differential power processing converter internally cuts off the output of the photovoltaic module to ensure safety in the event of a fire, and the external wiring is simplified by connecting the differential power processing converter and the photovoltaic module in series externally and making parallel wiring inside the differential power processing converter so as to improve the ease of installation.

Although the embodiments of the disclosure have been described, it will be understood by those skilled in the art that modification can be easily made without departing from technical spirit of the disclosure. Therefore, the embodiments of the disclosure are merely for illustrative purpose only, and the scope of the disclosure will be defined by the appended claims and equivalents thereof.

The invention claimed is:

1. A differential power processing apparatus for photovoltaic power generation, which compensates for a power mismatch between a pair of photovoltaic modules, the differential power processing apparatus comprising:

first and second terminals disposed to connect to a first photovoltaic module disposed outside;

third and fourth terminals disposed to connect to a first differential power processing apparatus disposed outside; and fifth and sixth terminals disposed to connect to a second differential power processing apparatus disposed outside, wherein the first terminal is connected to a positive output terminal of the first photovoltaic module, and the second terminal is connected to a negative output terminal of the first photovoltaic module, wherein the third terminal is internally connected to the first terminal and mediates a connection between the positive output terminal of the first photovoltaic module and the first differential power processing apparatus, and the fourth terminal is internally connected to the second terminal and mediates a connection between the negative output terminal of the first photovoltaic module and the first differential power processing apparatus, and wherein the fifth terminal is connected to a positive output terminal of a second photovoltaic module disposed outside via a connection with the second differential power processing apparatus, and the sixth terminal is connected to a negative output terminal of the second photovoltaic module via a connection with the second differential power processing apparatus.

2. The differential power processing apparatus of claim 1, wherein the second terminal and the fifth terminal are connected internally to provide a series connection between the first photovoltaic module and the second photovoltaic module.

3. The differential power processing apparatus of claim 2, further comprising a first switch disposed between the second terminal and the fifth terminal, wherein the first switch mediates an electrical connection between the first photovoltaic module and the second photovoltaic module.

4. The differential power processing apparatus of claim 1, further comprising:

a second switch connected between the third terminal and the sixth terminal;

a third switch comprising a first end connected to the sixth terminal and a second end connected to the second switch; and an inductor comprising a first end connected to a first node disposed between the second switch and the third switch, and a second end connected to a second node disposed between the second terminal and the fifth terminal.

5. A differential power processing apparatus for photovoltaic power generation, which compensates for a power mismatch between a pair of photovoltaic modules, the differential power processing apparatus comprising:

a first terminal disposed to connect to a negative output terminal of a first photovoltaic module disposed outside;

a second terminal disposed to connect to a positive output terminal of a second photovoltaic module disposed outside;

a third terminal disposed to connect to a positive terminal of a first differential power processing apparatus disposed outside;

a fourth terminal disposed to connect to a negative terminal of the first differential power processing apparatus;

a fifth terminal disposed to connect to a positive terminal of a second differential power processing apparatus disposed outside; and a sixth terminal disposed to connect to a negative terminal of the second differential power processing apparatus, wherein the first terminal is internally connected to the fourth terminal, and the second terminal is internally connected to the fifth terminal, and wherein the third terminal is connected to a positive output terminal of the first photovoltaic module via a connection with the first differential power processing apparatus, and the sixth terminal is connected to a negative output terminal of the second photovoltaic module via a connection with the second differential power processing apparatus.

6. The differential power processing apparatus of claim 5, wherein the first terminal and the second terminal are connected internally to provide a series connection between the first photovoltaic module and the second photovoltaic module.

7. The differential power processing apparatus of claim 6, further comprising a first switch disposed between the first terminal and the second terminal, wherein the first switch mediates an electrical connection between the first photovoltaic module and the second photovoltaic module.

8. The differential power processing apparatus of claim 5, further comprising:

a second switch connected between the third terminal and the sixth terminal;

a third switch comprising a first end connected to the sixth terminal, and a second end connected to the second switch; and an inductor comprising a first end connected to a first node disposed between the second switch and the third switch, and a second end connected to a second node disposed between the first terminal and the second terminal.

* * * * *